July 19, 1927.

J. F. BROMMER

CARTRIDGE FOR GREASE GUNS

Filed July 10, 1924

1,636,407

INVENTOR
John Frederick Brommer
BY
ATTORNEYS

Patented July 19, 1927.

1,636,407

UNITED STATES PATENT OFFICE.

JOHN FREDERICK BROMMER, OF RICHMOND HILL, NEW YORK.

CARTRIDGE FOR GREASE GUNS.

Application filed July 10, 1924. Serial No. 725,219.

The object of my invention is to provide a grease gun cartridge as an article of manufacture for use in connection with grease guns of ordinary construction, whereby the filling of the grease gun may be attained without the usual liability of smearing the grease over the hands and clothing of the dealer or user, or over the gun; whereby the user may keep an ample supply of an approved or suitable grease on hand in convenient form for immediate use; whereby the dealer may also keep a supply on hand for quick and ready sale; and whereby the cartridge shell may be withdrawn from the barrel of the gun by the plunger by providing the cartridge shell with means adapted to be engaged by the plunger in its rearward movement, said means permitting the forward movement of the plunger past the same.

A practical embodiment of my invention is represented in the accompanying drawings in which Fig. 1 represents the grease gun cartridge in perspective.

Figure 1:
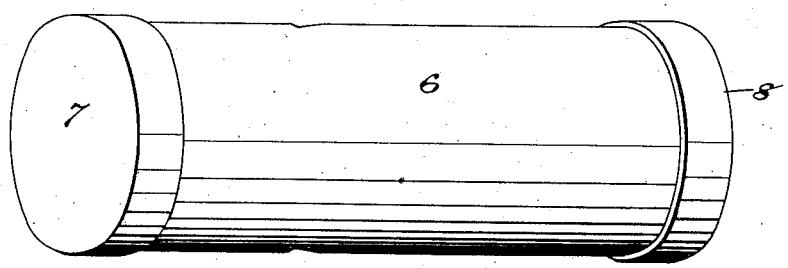
Figure 2:
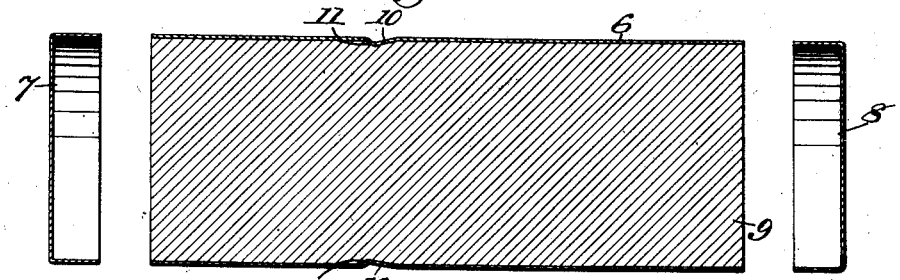
Fig. 2 represents a longitudinal central section through the cartridge showing the end caps removed from the shell, preparatory to the insertion of the cartridge into the grease gun.
Figure 3:
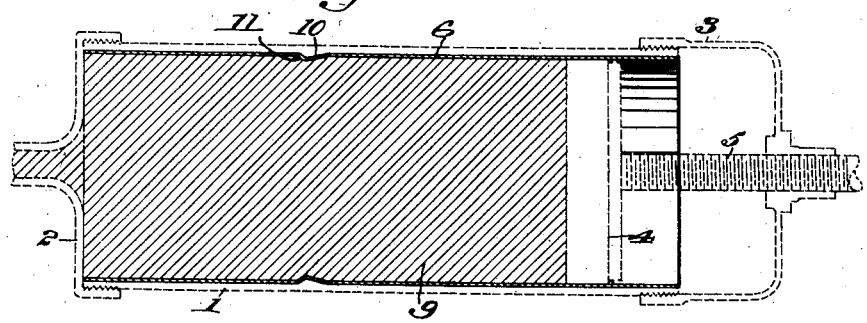
Fig. 3 represents the cartridge in longitudinal central section in position for use, the grease gun being shown in dotted lines.
Figure 4:
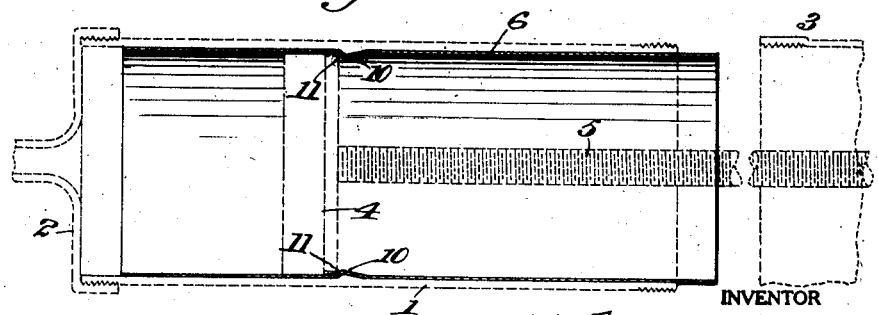
Fig. 4 represents a similar view showing the plunger in the act of withdrawing the cartridge shell from the gun barrel after the grease has been forced from the cartridge.

The grease gun comprises the continuous barrel 1, the nozzle end 2, the plunger end 3, the plunger 4 and the screw-threaded plunger shank 5.

The grease cartridge comprises the tubular shell 6 open at both ends and the removable end caps 7 and 8. The shell and end caps may be made of any suitable material for containing and retaining the grease 9. When it is desired to use the cartridge, the end caps 7 and 8 are removed from the shell 6. Either the nozzle end or plunger end of the grease gun is removed. The cartridge gun shell containing the grease is then inserted into the barrel 1 of the grease gun. After the shell has been shoved into its position within the grease gun barrel the nozzle end or the plunger end, as the case may be, is again attached to the gun barrel. To expel the grease the plunger 4 may be moved forwardly along within the shell. The shell is preferably made of very thin sheet material so that the usual plunger may be employed.

The means which I have shown for permitting the empty shell to be withdrawn from the gun barrel by the plunger is as follows:

I distort the shell to produce one or more, in the present instance two projections having a flat inclined portion 10 toward the rear end of the shell and a sharp inclined portion 11 toward the front end of the shell. This form of projecting means will permit the plunger to be moved forwardly past the projecting means to expel the grease from the cartridge shell and thereby from the gun but will cause the plunger to engage the projecting means when the plunger is moved rearwardly and thereby permit the plunger to withdraw the shell from the gun barrel when the plunger end 3 of the gun is removed from the barrel.

It is obvious that one or more of these inward projections may be provided as found desirable and it is preferable that these projections be slightly yielding so as to permit the ready passage of the plunger forwardly by the same and to present a resistance to the rearward movement of the plunger by the same, sufficient to permit the plunger to withdraw the shell from the gun barrel when the plunger end of the gun is removed.

From the above description it will be seen that I have provided a very simple and effective means for removing the empty cartridge shell from the gun barrel.

It is evident that various forms of inward projections may be provided, hence I do not wish to limit myself to the particular form herein shown and described, but

What I claim is:—

1. A grease gun cartridge comprising a tubular shell having removable end caps and adapted to be inserted into the gun barrel with both end caps removed, said shell being adapted to slidably receive the gun plunger and having means located in position to be engaged by the plunger for withdrawing the shell from the barrel.

2. A grease gun cartridge comprising a tubular shell having removable end caps and adapted to be inserted into the gun barrel with both end caps removed, said shell being adapted to slidably receive the gun plunger and having yielding means located in position to be engaged by the plunger for withdrawing the shell from the barrel.

3. A grease gun cartridge comprising a tubular shell having removable end caps and adapted to be inserted into the gun barrel with both end caps removed, said shell being adapted to slidably receive the gun plunger and having a plurality of projections located in position to be engaged by the plunger for withdrawing the shell from the barrel.

4. A grease gun cartridge comprising a tubular shell having removable end caps and adapted to be inserted into the gun barrel with both end caps removed, said shell being adapted to slidably receive the gun plunger and having a plurality of yielding projections located in position to be engaged by the plunger for withdrawing the shell from the barrel.

5. A grease gun cartridge comprising a tubular shell having removable end caps and adapted to be inserted into the gun barrel with both end caps removed, the shell being adapted to slidably receive the gun plunger, the walls of said shell being distorted to form a plurality of projections located in position to be engaged by the plunger for withdrawing the shell from the barrel.

6. A grease gun cartridge comprising a tubular shell having removable end caps and adapted to be inserted into the gun barrel with both end caps removed, the shell being adapted to slidably receive the gun plunger, the walls of said shell being distorted to form a plurality of yielding projections located in position to be engaged by the plunger for withdrawing the shell from the barrel.

In testimony, that I claim the foregoing as my invention, I have signed my name this 18th day of June 1924.

JOHN FREDERICK BROMMER.